June 29, 1948.   J. C. WARWICK   2,444,148
COUPLING DEVICE
Filed Nov. 30, 1943   2 Sheets-Sheet 1

INVENTOR.
JAMES C. WARWICK
BY
ATTORNEY

June 29, 1948. J. C. WARWICK 2,444,148
COUPLING DEVICE
Filed Nov. 30, 1943 2 Sheets-Sheet 2
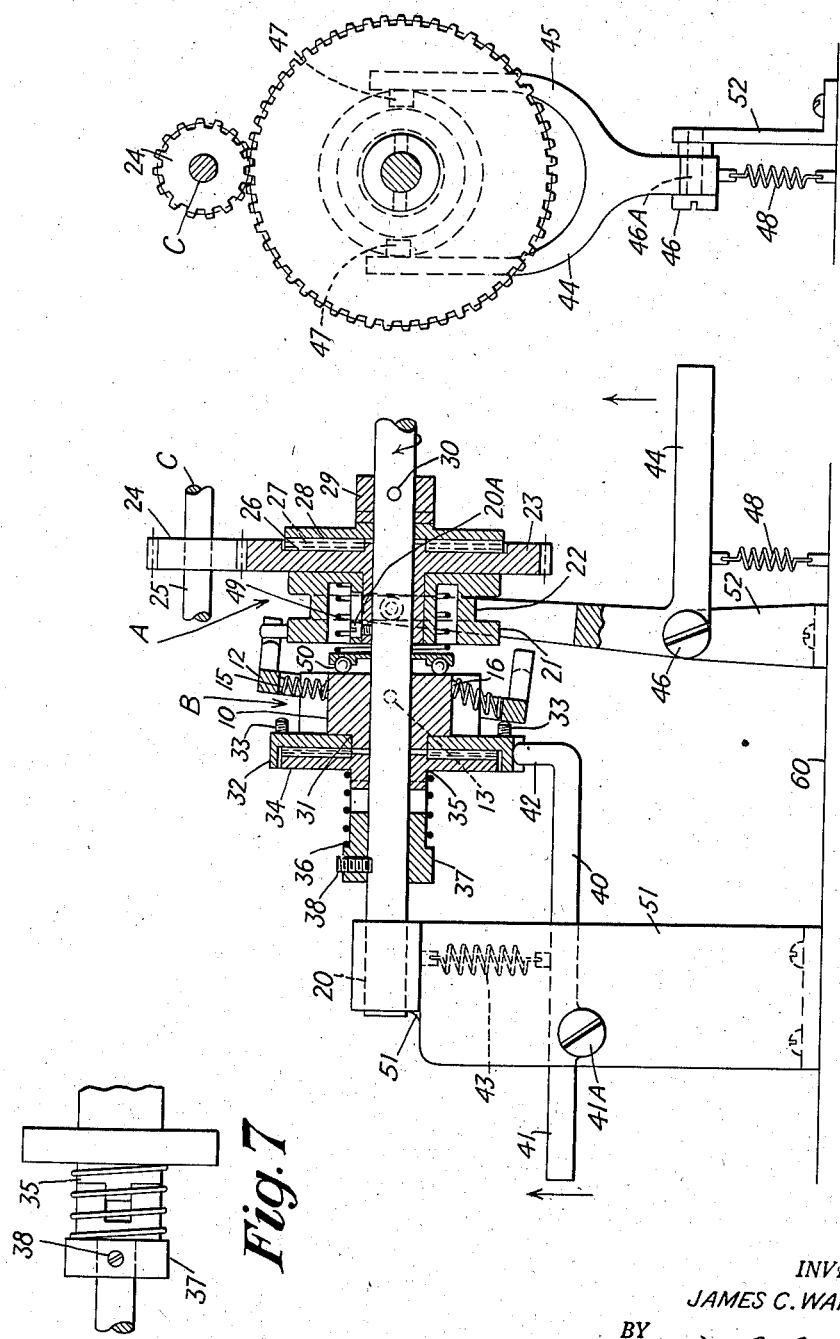
INVENTOR.
JAMES C. WARWICK
BY
*H. G. Grove*
ATTORNEY Patented June 29, 1948

2,444,148

UNITED STATES PATENT OFFICE 2,444,148

COUPLING DEVICE

James C. Warwick, Beechhurst, N. Y., assignor to Radio Corporation of America, a corporation of Delaware Application November 30, 1943, Serial No. 512,321

5 Claims. (Cl. 192—30)

1

This invention relates to a new and useful escapement device having two rotating members, one serving as a driving member and the other as a driven member, both members rotating on the same axis.

An object of this invention is to provide a coupling means whereby the angular relation of the two members may be changed in predetermined steps through 360 degrees without fully uncoupling or stopping their rotation.

Another object of this invention is to provide a coupling mechanism which is particularly adapted for use with the synchronously driven auto base when employed in four channel time division multiplex printing apparatus.

A feature of this invention is a novel coupling mechanism which has a rotating driving member equipped with a plurality of angularly spaced engaging pins, the spacing of which may be arranged at predetermined constant or varied intervals around its periphery. A rotating driven member has means located thereon for making mechanical coupling with the engaging pins of the driving member.

This invention will best be understood by referring to the accompanying drawings in which:

Fig. 5 is a sectional view of a modification of the coupling device of this invention, Fig. 6 is an end elevation of Fig. 5, and Fig. 7 is a detail plan view of Fig. 5.

Figure 1:
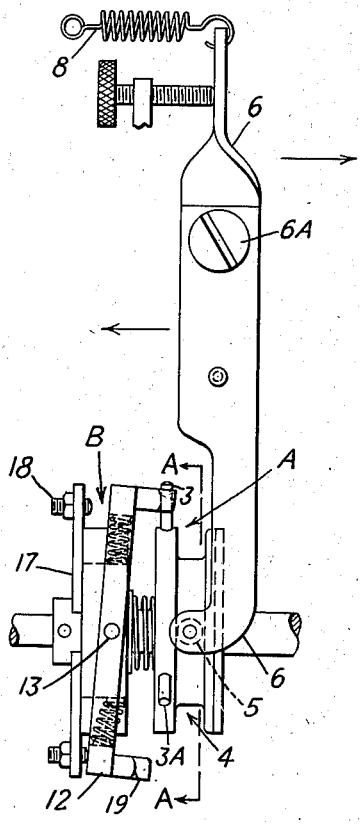
Fig. 1 is a side elevation of the coupling device.
Figure 2:
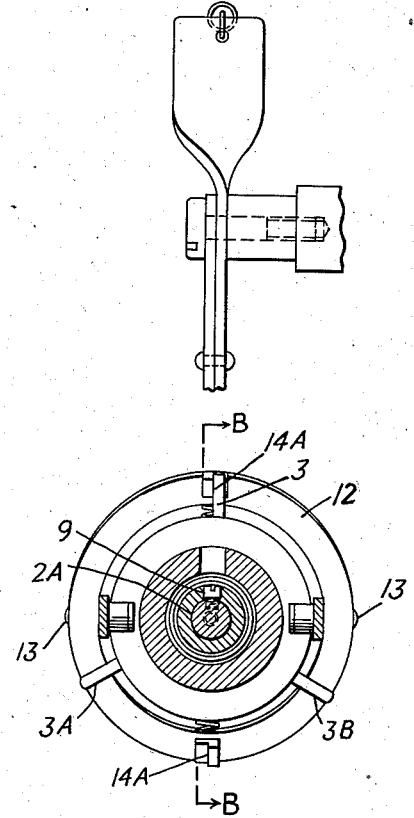
Fig. 2 is a section, the line being taken through A—A of Fig. 1.
Figure 3:
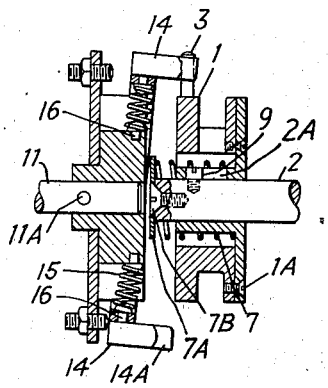
Fig. 3 is a partial section through line B—B of Fig. 2.
Figure 4:
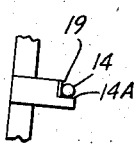
Fig. 4 is a partial plan view of Fig. 3.

Referring now in detail to Figs. 1, 2, 3 and 4 of the drawings, the coupling device of this invention consists mainly of two members, one a driving member A and the other a driven member B. The driving member A includes a disc 1 which is keyed to a shaft 2 and is slidable along its axis. The disc 1 has pins or protrusions 3, 3A and 3B angularly spaced at predetermined constant or varied intervals around its periphery, as may be desired, to drive the driven member B. The disc 1 has a groove 4, which is cut around its outer periphery for engagement with rollers 5 arranged on a forked actuating lever 6. A spring 7 surrounds shaft 2 and is arranged to urge the disc 1 to normal rest against a key 9 in a slot 2A. Spring 7 is retained in position on shaft 2 by means of a washer 7A and screw 7B. The actuating lever 6 is pivoted by

2 a pivot screw 6A. The extreme end of lever 6 is provided with a helical tension spring 8 which urges the lever to a normal vertical rest position. The driven member B comprises a disc 10 fixed rigidly to a shaft 11 by means of a pin 11A. The disc 10 carries a spring toggle ring 12 which is pivoted on disc 10 by means of two pins 13. On the outer edge of the spring toggle ring 12 and located 180 degrees apart from each other are two extending dogs 14. One end of each dog 14 is notched to provide a round surface 19. These dogs are arranged so that a line drawn parallel to the working surface 14A of the dogs is at right angles to the pivot pins 13. The toggle ring 12 is urged to its rest position by means of two compression springs 15 which are seated and retained by spherical headed pins 16. The extreme end of disc 10 is provided with a shoulder portion on which are secured two strips 17 carrying adjusting screws 18 for adjusting the travel of the toggle ring 12.

In the operation of this mechanism in the normal running condition, a pin or protrusion 3 is seated in the notched end of one of the dogs 14. The driving force from one member to the other is transmitted through the contact between the pin and the surface 14a on dog 14. Whenever it is desired to change the angular relation between the two rotating members A and B, the actuating lever 6 is rotated slightly clockwise by manual, electrical, or mechanical means so as to move the driving member A toward the driven member B against the pressure of spring 7. The electrical means may be associated with the magnets of a multiplex printing system. The pin 3 which engages dog 14 will exert a force against the surface 19 and thus will rotate ring 12 about pins 13 until the springs 15 are forced past their normal vertical center. Thus the toggle ring 12 assumes a new position with the first mentioned dog 14, which previously had just been in driving contact with pin or protrusion 3 on member A, now retracted, and the opposite dog pushed forward. Now when the pressure is removed from the actuating lever 6, springs 7 and 8 urge lever 6 and member A to the normal position. The toggle ring, however, remains in its new position due to springs 15 having been forced past their center of greatest compression. Thus the first pin 3 is withdrawn from the line of action of the surface 14a of the first dog, and a second pin 3a of the driving member A is drawn into the line of action of the surface 14a of the second dog. After the above mentioned operation the driven member B coasts momentarily while the driving member A takes up the desired angular change.

Referring now to the modifications shown in Figs. 5, 6 and 7, a common driving shaft 20 has located thereon a combined sleeve and spur gear 23 to which is slidably keyed a driving disc 21. The driving disc has a slot for key 20A and is otherwise of the same general construction as disc 1 in Fig. 1, 2 and 3. Spur gear 23 is arranged to mesh with a driven pinion gear 24 which is mounted upon a driven shaft 25. The spur gear 23 has its outer surface counterbored at 26 in which a friction clutch disc member 27 is located. A clutch disc 28 having a shouldered portion 29 is fastened to shaft 20 by means of a pin 30 and is arranged so that disc 28 can be frictionally engaged with disc 27 on gear 23. The disc 10, which is of the same general construction as that disclosed in Figs. 1, 2, 3 and 4, includes spring toggle ring 12, which is pivoted on disc 10 by means of two pins 13. The outer edge of ring 12 also carries two dogs 14. One end of each dog is notched to provide a round surface 19. The toggle ring 12 is urged to its rest positions by springs 15 which are seated and retained by spherical headed pins 16 secured to ring 12 and disc 10. A shouldered portion 31 has located thereon a disc 32 which serves as a stop cam. The surface of disc 32 adjacent the toggle ring 12 is provided with two adjusting screws 33 for adjusting the travel of toggle ring 12. The clutch disc 34 has a shouldered keyed portion 35 which engages slotted collar 37, the slot and key portions being retained in frictional engagement with disc 32 by means of a helical spring 36 which which is retained on shaft 20 by a shoulder on collar 37. The collar 37 is retained to rotate with shaft 20 by means of a set screw 38. A release arm 40 has its rear portion 41 pivoted by a screw 41A. The front portion of arm 40 has an extending portion 42 which engages with a slot in stop cam 32. Spring 43, fixed at one end to a post 51 in base 60, and at the other end to the release arm 40, holds the extending portion 42 in position to engage the stop cam member 32. The driving disc 21 has a groove 22 which is cut around its outer periphery for engagement with rollers 47 arranged on a forked actuating arm 44.

The actuating arm 44 has a yoke portion 45 and is pivoted at 46 by a screw 46A on a support 52. The rollers 47 are arranged to engage in slot 22 of driving disc 21. A spring 48 retains the actuating arm 44 in its normal position. The driving disc 21 is provided with a helical spring 49 which urges it to normal rest against spur gear 23. Floating member 50 is a thrust ball bearing to reduce friction between members A and B.

The step by step operation of this device is similar to the operation mentioned above in connection with the device shown by Figs. 1, 2, 3 and 4, except that in addition member B, which includes the stop cam disc 32, may be held stationary by having the extending portion of arm 40 engage in the slot of stop cam disc 32 while step-by-step rotation is produced in member A (and consequently in driven member C through gears 23 and 24) by the actuation of arm 45, or when desired a continuous rotation may be produced in the driven member C by permitting member B, through the engagement with clutch 27, to rotate with member A in its normal position.

While I have indicated and described a system of my invention, it will be apparent to one skilled in the art that my invention is by no means limited to the particular devices shown and described, but that many modifications may be made without departing from the scope of my invention.

What I claim is:

1. A coupling device comprising a driving disc member having a concentric groove located on its outer periphery, a plurality of spaced projecting pins located adjacent said groove, a driven disc member, a spring toggle ring pivotally mounted on said driven disc member, a shaft for said driving disc member, said ring having engaging means located thereon for engaging said projecting pins, a shaft for said driven disc member, each shaft being mounted coaxially with respect to the other, and engaging means including a forked actuating lever having an end positioned in said concentric groove to move said driving disc on its shaft to disengage the projecting pins with the engaging means to change the angular relationship of said driven disc member with respect to said driving disc member.

2. A coupling device comprising a driving disc member having spaced engaging pins and a concentric groove located on its outer periphery, a driven disc member having a spring toggle ring pivotally located thereon, said ring having engaging means located thereon for engaging said pins, a shaft for said driving disc member, a shaft for said driven disc member, each shaft being mounted coaxially with respect to the other, and engaging means positioned in said concentric groove to move said driving disc on its shaft to disengage the pins with the engaging means to change the angular relationship of said driven disc member with respect to said driving disc member.

3. A coupling device for use with a four channel time division multiplex printer comprising a driving disc member having a concentric groove located on its outer periphery, a plurality of engaging pins located adjacent said concentric groove, a driven disc member, a spring toggle ring pivotally mounted on said driven disc member, said ring having engaging means located thereon for engaging said engaging pins, a shaft for said driving disc member, a shaft for said driven disc member, each shaft being mounted coaxially with respect to the other, and engaging means positioned in said concentric groove to move said driving disc on its shaft to disengage the pins with the engaging means on said ring to change the angular relationship of said driven disc member with respect to said driving disc member.

4. A coupling device of the escapement type comprising a driving disc member having a concentric groove located on its outer periphery, a plurality of spaced projecting pins located adjacent said groove, a driven disc member having a spring toggle ring mounted by a pair of pivots on said driven disc member, said spring toggle ring having engaging means located thereon for engaging said projecting pins, a shaft for said driving member, a shaft for said driven disc member, one of said shafts being mounted coaxially with respect to the other, and engaging means positioned in said concentric groove to move said driving disc on its shaft to disengage the projecting pins with the engaging means to change the angular relationship of said driven disc member with respect to said driving disc member.

5. A coupling device comprising a driving disc member having a concentric groove located on its periphery, a plurality of spaced projecting pins located adjacent said groove, a driven disc member, a spring toggle ring mounted by a pair of pivots on said driven disc member, said ring having engaging means located thereon for engaging said projecting pins, a spring member surrounding a portion of the shaft of said driving disc member and being interposed between said driving disc and the end of said shaft, a shaft for said driven disc member, one of said shafts being mounted coaxially with respect to the other, and engaging means positioned in said concentric groove to compress said spring to move said driving disc to disengage the pins with the engaging means to change the angular relationship of said driven disc member with respect to said driving disc member.

JAMES C. WARWICK.

REFERENCES CITED

The following references are of record in the file of this patent:

UNITED STATES PATENTS

| Number | Name | Date |
| --- | --- | --- |
| 839,334 | Sutton | Dec. 25, 1906 |
| 1,197,802 | DeLaney | Sept. 12, 1916 |
| 1,273,764 | Garrett | July 23, 1918 |
| 2,205,838 | Redd | June 25, 1940 |
| 2,253,842 | Brotman | Aug. 26, 1941 |
| 2,314,193 | Boor | Mar. 16, 1943 |